(12) United States Patent
Yogo

(10) Patent No.: US 8,322,187 B2
(45) Date of Patent: Dec. 4, 2012

(54) BENDING DEVICE

(75) Inventor: Teruaki Yogo, Aichi (JP)

(73) Assignee: Kabushiki Kaisha Opton, Aichi (JP)

( * ) Notice: Subject to any disclaimer, the term of this patent is extended or adjusted under 35 U.S.C. 154(b) by 0 days.

(21) Appl. No.: 12/864,912

(22) PCT Filed: Jan. 31, 2008

(86) PCT No.: PCT/JP2008/051542
§ 371 (c)(1),
(2), (4) Date: Jul. 28, 2010

(87) PCT Pub. No.: WO2009/096024
PCT Pub. Date: Aug. 6, 2009

(65) Prior Publication Data
US 2010/0307214 A1    Dec. 9, 2010

(51) Int. Cl.
*B21D 43/10* (2006.01)
*B21D 9/05* (2006.01)
(52) U.S. Cl. ............................ 72/422; 72/149
(58) Field of Classification Search ............ 72/306–307, 72/361, 422, 419–421, 20.5, 149, 150
See application file for complete search history.

(56) References Cited

U.S. PATENT DOCUMENTS

| 3,431,759 | A * | 3/1969 | Kidera et al. | 72/422 |
| 8,056,387 | B2 * | 11/2011 | Yogo | 72/149 |
| 2005/0241356 | A1 * | 11/2005 | Yogo | 72/149 |
| 2007/0199361 | A1 | 8/2007 | Yogo | |

FOREIGN PATENT DOCUMENTS

| EP | 1810762 | 7/2007 |
| JP | 3-15214 | 4/1991 |
| JP | 3128126 | 5/1991 |
| JP | 3-66970 | 10/1991 |
| JP | 3234320 | 10/1991 |
| JP | 7108326 | 4/1995 |
| JP | 9234504 | 9/1997 |
| JP | 11226656 | 8/1999 |
| JP | 2001-212624 | 8/2001 |
| JP | 2004195484 | 7/2004 |
| JP | 2007508144 | 4/2007 |
| JP | 2008-36676 | 2/2008 |
| KR | 20070073821 A | 7/2007 |

(Continued)

OTHER PUBLICATIONS

Form PCT/IB/338, Notification of Transmittal of Translation of the International Preliminary Report on Patentability (Chapter I or Chapter II of the Patent Cooperation Treaty), dated Sep. 10, 2010, 1 page.

(Continued)

*Primary Examiner* — Edward Tolan
*Assistant Examiner* — Mohammad I Yusuf
(74) *Attorney, Agent, or Firm* — James L. Young; Westerman, Champlin & Kelly, P.A.

(57) ABSTRACT

A bending device includes a bending mechanism for holding an elongated workpiece between a bending die and a clamping die revolvable around the bending die, and revolving the clamping die, to thereby bend the workpiece. The bending device includes a fixing base on which the bending mechanism is mounted, and an articulated robot on which a chuck mechanism for holding the workpiece is mounted and which moves the chuck mechanism.

5 Claims, 10 Drawing Sheets

FOREIGN PATENT DOCUMENTS

WO        2006/049165        5/2006

OTHER PUBLICATIONS

Form PCT/IB/373, International Preliminary Report on Patentability, issued Aug. 31, 2010, 1 page.
Form PCT/ISA/237, Written Opinion of the International Searching Authority, issued Aug. 31, 2010, 4 pages.
International Search Report from corresponding PCT Application No. PCT/JP2008/051542 mailed Mar. 25, 2008 (2 pages).
Notice of Reason(s) for Rejection mailed Jan. 31, 2012 in counterpart Japanese Patent Application No. 2006-214980 & English translation (5 pages).
Decision of Rejection mailed Jan. 31, 2012 in counterpart Japanese Patent Application No. 2006-214981 & English translation (3 pages).
Japanese Office Action—Notice of Reason(s) for Rejection, with English translation, from counterpart Japanese Patent Application No. 2006-214981 dated Sep. 27, 2011 (4 pages).
Japanese Office Action—Notice of Reason(s) for Rejection, with English translation, from counterpart Japanese Patent Application No. 2006-214980 dated Sep. 27, 2011 (4 pages).
English translation of Notice of Preliminary Rejection dated Apr. 4, 2012, in counterpart Korean Patent Application No. 10-2010-7016590 (seven pages).

* cited by examiner

BENDING DEVICE

CROSS-REFERENCE TO RELATED APPLICATION

This Application is a Section 371 National Stage Application of International Application No. PCT/JP2008/051542, filed Jan. 31, 2008 and published as WO 2009/096024 on Aug. 6, 2009, the contents of which are hereby incorporated by reference in their entirety.

TECHNICAL FIELD

The present invention relates to a bending device in which, when bending an elongated workpiece, such as a pipe or a rod-shaped member, in a predetermined direction, the bending is performed while moving the workpiece.

BACKGROUND ART

In a conventional known bending device such as described in Patent Document 1, a workpiece is held by a chuck mechanism, a bending mechanism is attached to an end of an articulated robot having three sets of joints each turning around an axis parallel to an axial direction of the workpiece, the bending mechanism is moved to a predetermined position by turning the respective joints, while the chuck mechanism is moved in the axial direction of the workpiece by means of a moving mechanism, to thereby perform bending at a plurality of points.

Patent Document 1: Japanese Unexamined Patent Application Publication No. 2001-212624

DISCLOSURE OF THE INVENTION

Problems to be Solved by the Invention

Such a conventional bending device involves the following problem: Since the chuck mechanism is moved by means of the moving mechanism to thereby move the workpiece in the axial direction, a sufficient space to allow the moving mechanism to move the chuck mechanism which is holding the workpiece is required, and thus the device is larger in size and requires a larger installation space.

It is desirable to provide a bending device that is small in size and does not require a large installation space. It is also desirable to mount the chuck mechanism on the articulated robot.

Means for Solving the Problems

A first aspect of the present invention is a bending device configured as below. Specifically, in the bending device having a bending mechanism for holding an elongated workpiece between a bending die and a clamping die revolvable around the bending die, and revolving the clamping die, to thereby bend the workpiece, the bending device includes: a fixing base on which the bending mechanism is mounted, and an articulated robot on which a chuck mechanism for holding the workpiece is mounted and which moves the chuck mechanism.

In the bending device, the chuck mechanism is preferably configured to turn the workpiece around a longitudinal direction thereof. Also, in the bending device, the articulated robot may include a plurality of parallel joints turning around mutually parallel axes and a plurality of perpendicular joints turning around axes perpendicular to the parallel axes.

Further, in the bending device, the chuck mechanism may include a turnably supported turning member and claw members swingably supported by the turning member, and may be configured to support a tubular member, into which the workpiece is longitudinally inserted, so as to be slidable in the turning member, and moves the tubular member to cause the claw members to swing and hold a periphery of the workpiece. Moreover, in the bending device, the chuck mechanism may be configured to turn the turning member within a predetermined angle range, to thereby twist the workpiece held by the chuck mechanism around a longitudinal direction thereof within the angle range.

Also, the bending device may further include a control unit that moves the chuck mechanism holding the workpiece in a longitudinal direction of the workpiece by means of the articulated robot when bending the workpiece by revolving the clamping die by means of the bending mechanism Any one of or a combination of these various features may be employed for the first aspect of the invention.

Effects of the Invention

The bending device according to the present invention achieves an effect that a large installation space is not required. Another effect is that when the chuck mechanism is configured to turn a workpiece around the longitudinal direction thereof, no restriction will be imposed on a direction of bending. A further effect is that bending can be performed in a preferred manner by moving the chuck mechanism holding the workpiece in the longitudinal direction of the workpiece by means of the articulated robot when the bending mechanism revolves the clamping die to thereby bend the workpiece.

EXPLANATION OF REFERENCE NUMERALS

| 1     | device base         | 2      | articulated robot   |
|-------|---------------------|--------|---------------------|
| 4     | workpiece           | 6, 8, 10 | parallel joint    |
| 12, 14 | perpendicular joint |        |                     |
| 40    | bending mechanism   | 42     | bending die         |
| 46    | bending arm         | 47     | first cylinder      |
| 48    | clamping die        | 50     | wiper die           |
| 52    | pressure die        | 58     | fixing base         |
| 60    | mandrel mechanism   | 64     | chuck mechanism     |
| 31    | mandrel             | 62     | twisting mechanism  |
| 66    | chuck body          | 74, 76 | claw member         |
| 84    | tubular member      | 120    | control circuit     |
| 122   | turn detection sensor |      |                     |

BEST MODE FOR CARRYING OUT THE INVENTION

Hereinafter, a detailed description will be provided on a best mode for carrying out the present invention, with reference to the drawings.

First Embodiment

Figure 1:
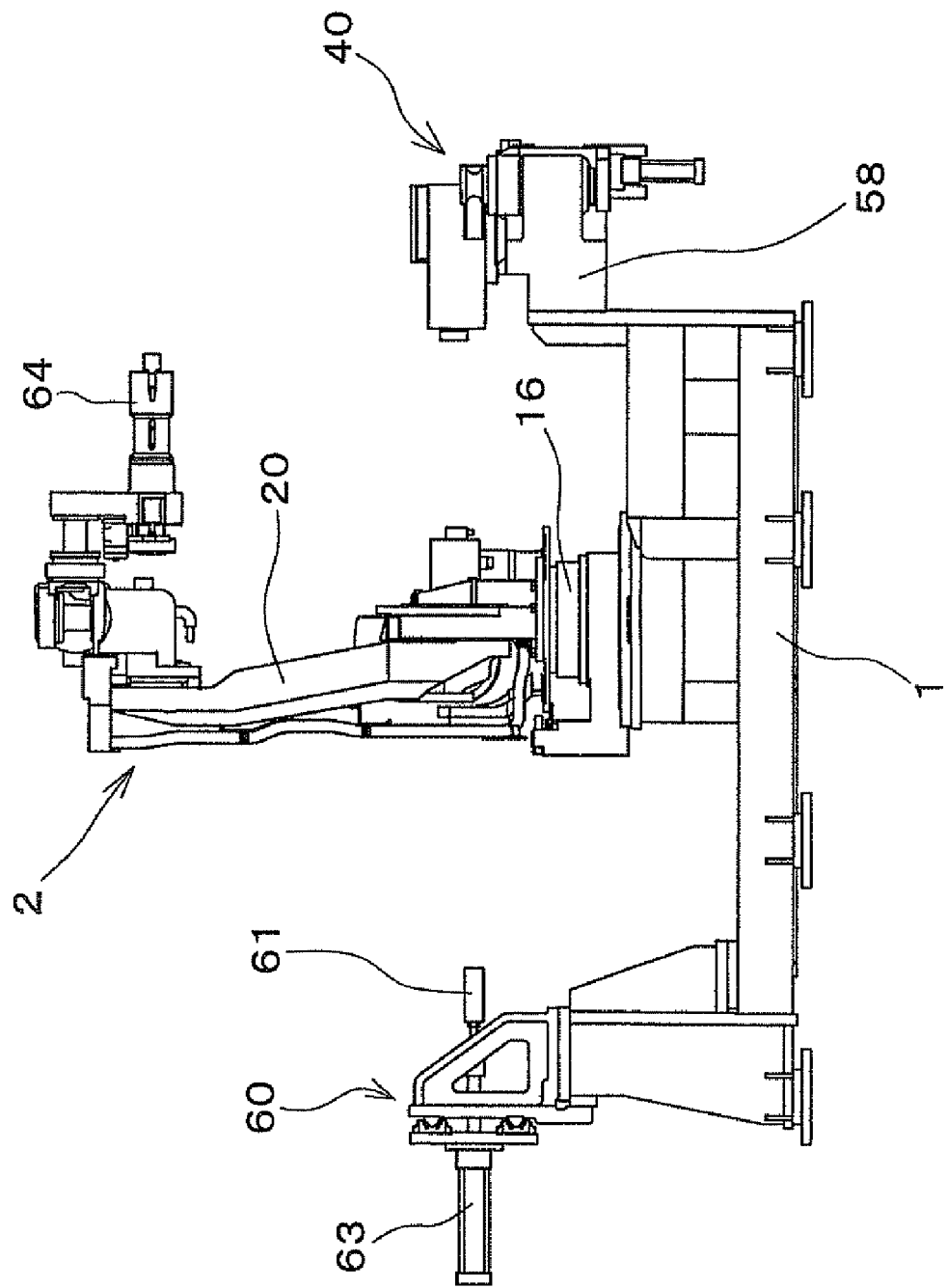
FIG. 1 is a front elevational view of a bending device in a first embodiment of the present invention.
Figure 2:
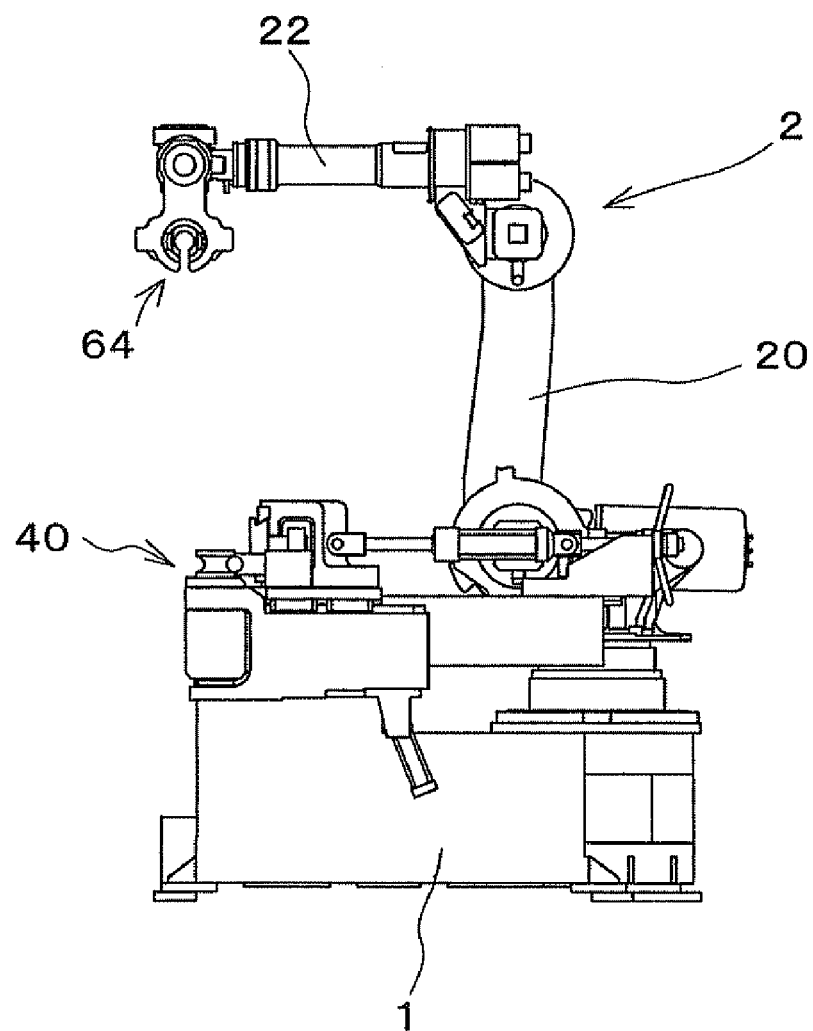
FIG. 2 is a side elevational view of the bending device in the first embodiment.
Figure 3:
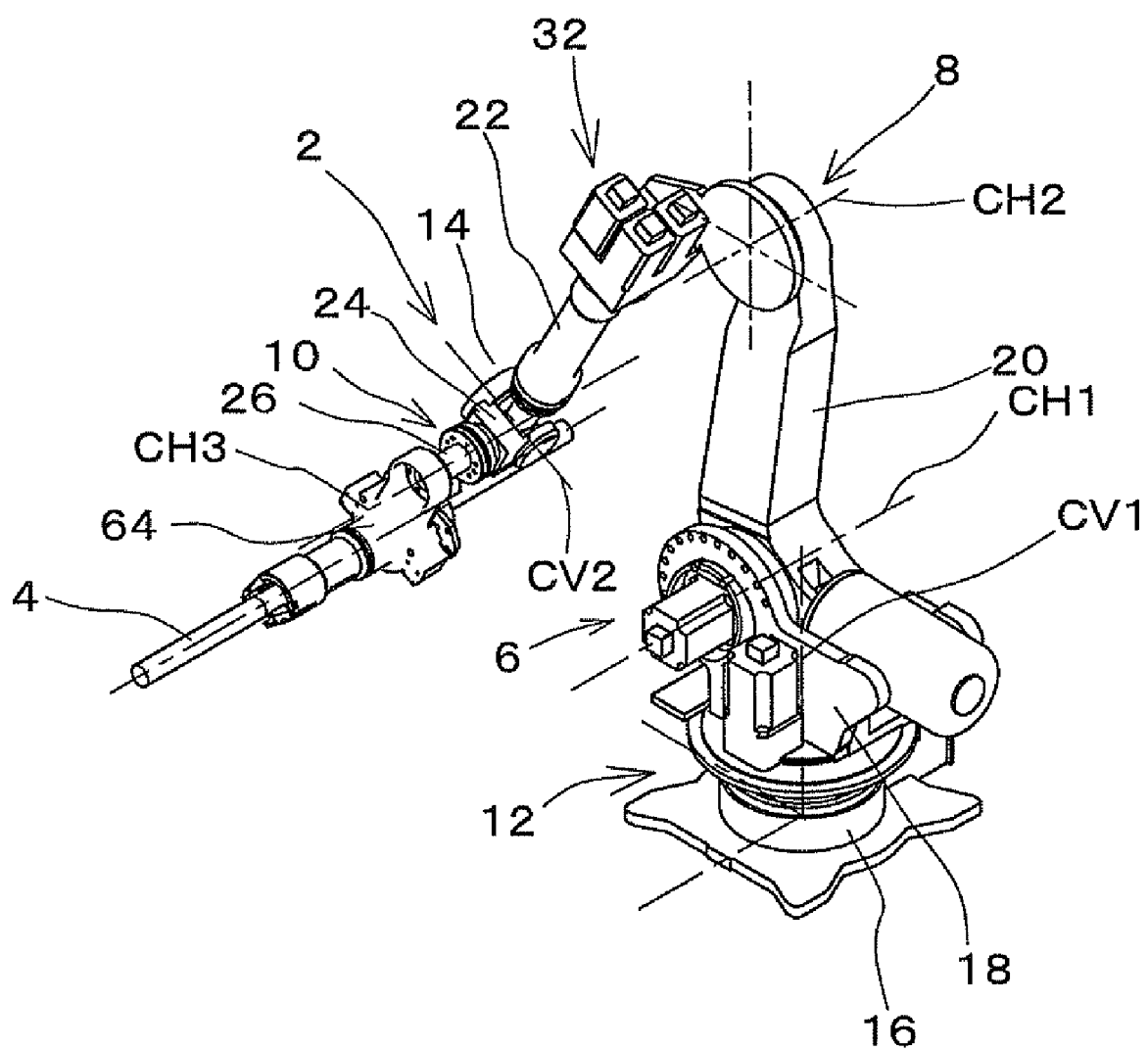
FIG. 3 is an enlarged perspective view of an articulated robot in the first embodiment.

As shown in FIG. 1 and FIG. 2, reference numeral 1 denotes a device base, and an articulated robot 2 is placed on the device base 1. As shown in FIG. 3, the articulated robot 2 is provided with three, first through third, parallel joints 6, 8 and 10 turning around mutually parallel axes and with two, first and second, perpendicular joints 12 and 14, turning around axes perpendicular to the respective parallel axes.

The articulated robot 2 is provided with a fixed portion 16 fixed to the device base 1, and the fixed portion 16 and a first swivel base 18 are connected to each other by the first perpendicular joint 12. The first perpendicular joint 12 has a known mechanism for turning the first swivel base 18 around a vertical axis CV1 by a predetermined angle.

One end of a first arm 20 is connected to the first swivel base 18 via the first parallel joint 6. The first parallel joint 6 has a known mechanism for turning the first arm 20 around a horizontal axis CH1 by a predetermined angle. The horizontal axis CH1 of the first parallel joint 6 and the vertical axis CV1 of the first perpendicular joint 12 are perpendicular to each other.

The other end of the first arm 20 and one end of a second arm 22 are connected to each other via a second parallel joint 8. The second parallel joint 8 has a known mechanism for turning the second arm 22 by a predetermined angle around an axis CH2 parallel to the horizontal axis CH1 of the first parallel joint 6.

A second swivel base 24 is connected to the other end of the second arm 22 via the second perpendicular joint 14. The second perpendicular joint 14 has a known mechanism for turning the second swivel base 24 by a predetermined angle around an axis CV2 perpendicular to the horizontal axes CH1 and CH2 of the first and second parallel joints 6 and 8.

One end of a distal end arm 26 is connected to the second swivel base 24 via the third parallel joint 10. The third parallel joint 10 turns the distal end arm 26 around an axis CH3 parallel to the horizontal axes CH1 and CH2 of the first and second parallel joints 6 and 8. Also, in the present embodiment, a turning joint 32 turning around a longitudinal axis of the second arm 22 is provided to the second arm 22.

Figure 4:
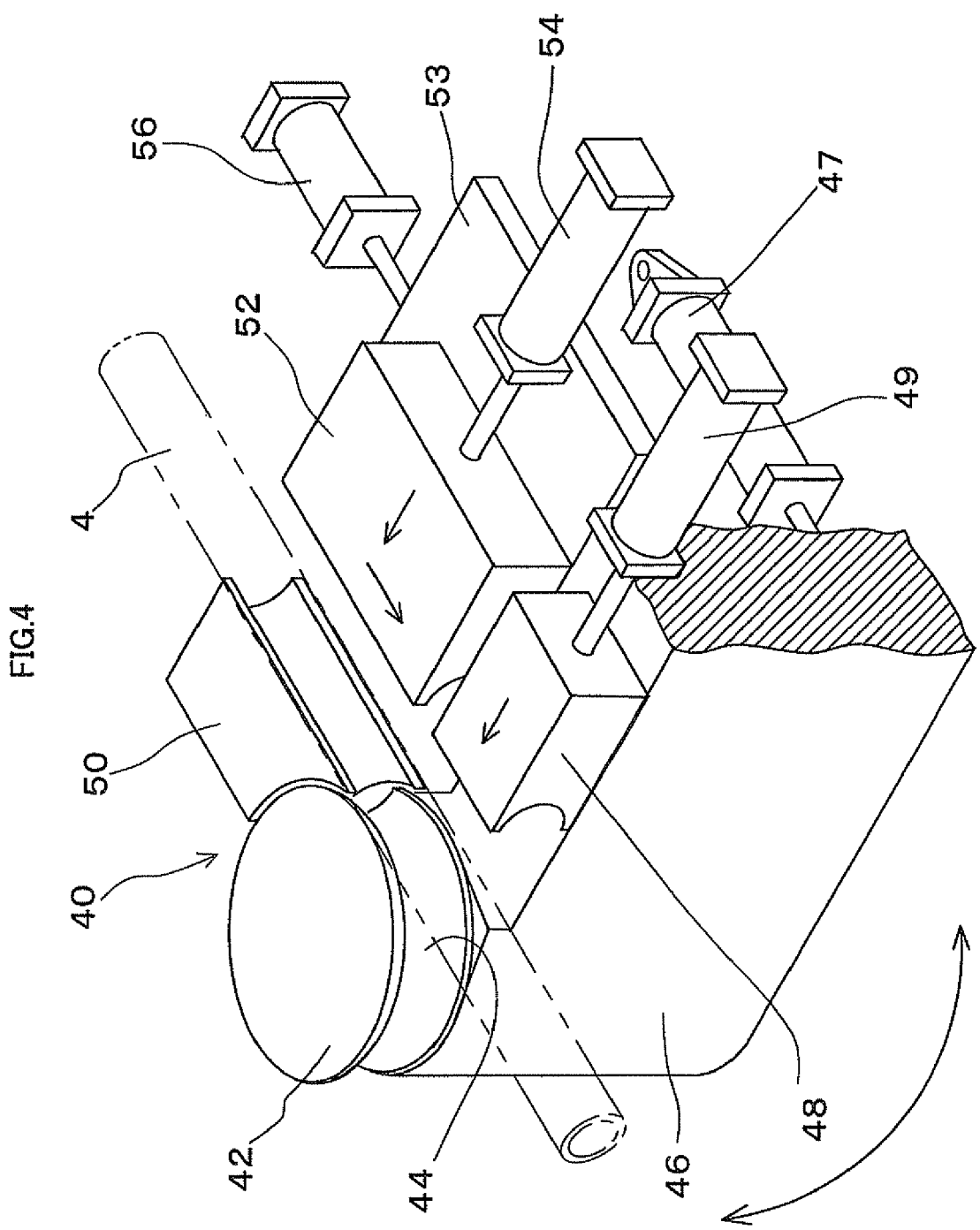
FIG. 4 is an enlarged schematic diagram of a bending mechanism in the first embodiment.

A bending mechanism 40 is mounted on a fixing base 58 integrally formed with the device base 1. As shown in FIG. 4, the bending mechanism 40 is provided with a bending die 42 formed depending on a bending radius of an elongated workpiece 4 such as a pipe, and a groove 44 depending on a diameter of the workpiece 4 is formed in an outer circumference of the bending die 42. The bending die 42 along with a bending arm 46 is turnably supported by the fixing base 58, and the bending arm 46 is attached so as to be turned by a first cylinder 47. Although the bending die 42 having a single groove 44 is shown in FIG. 4, the bending die 42 may have a plurality of grooves 44 corresponding to bending radii of the workpiece 4 and formed in a layered manner.

A clamping die 48 is movably supported on the bending arm 46 so as to face the bending die 42, and the clamping die 48 is configured to be driven by a second cylinder 49 to hold the workpiece 4 between the bending die 42 and the clamping die 48. Also, a wiper die 50 may be disposed close to the bending die 42.

A pressure die 52 is movably supported on a slide base 53 alongside the clamping die 48. The pressure die 52 is configured to be driven by a third cylinder 54 to be abutted to the workpiece 4 and receive a reaction force during a bending process. The slide base 53 is slidably supported in an axial direction of the workpiece 4 and is configured to be driven by the cylinder 56. A mandrel mechanism 60 is disposed on the device base 1 so as to be opposed to the bending mechanism 40. The mandrel mechanism 60 is for inserting a mandrel 61 into a pipe as the workpiece 4 by a cylinder 63.

Figure 5:
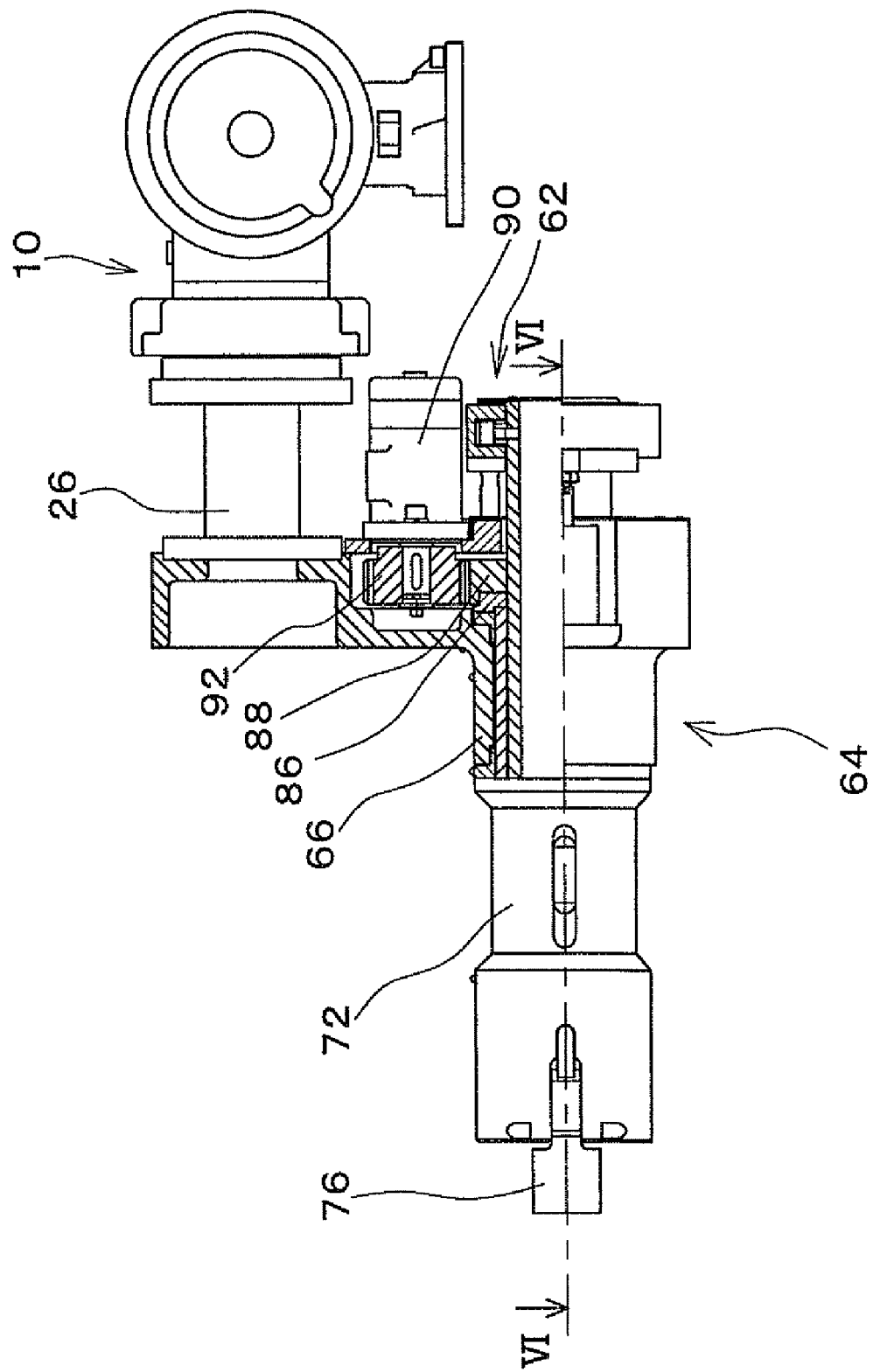
FIG. 5 is an enlarged front elevational view showing a cross section of part of the chuck mechanism in the first embodiment.
Figure 6:
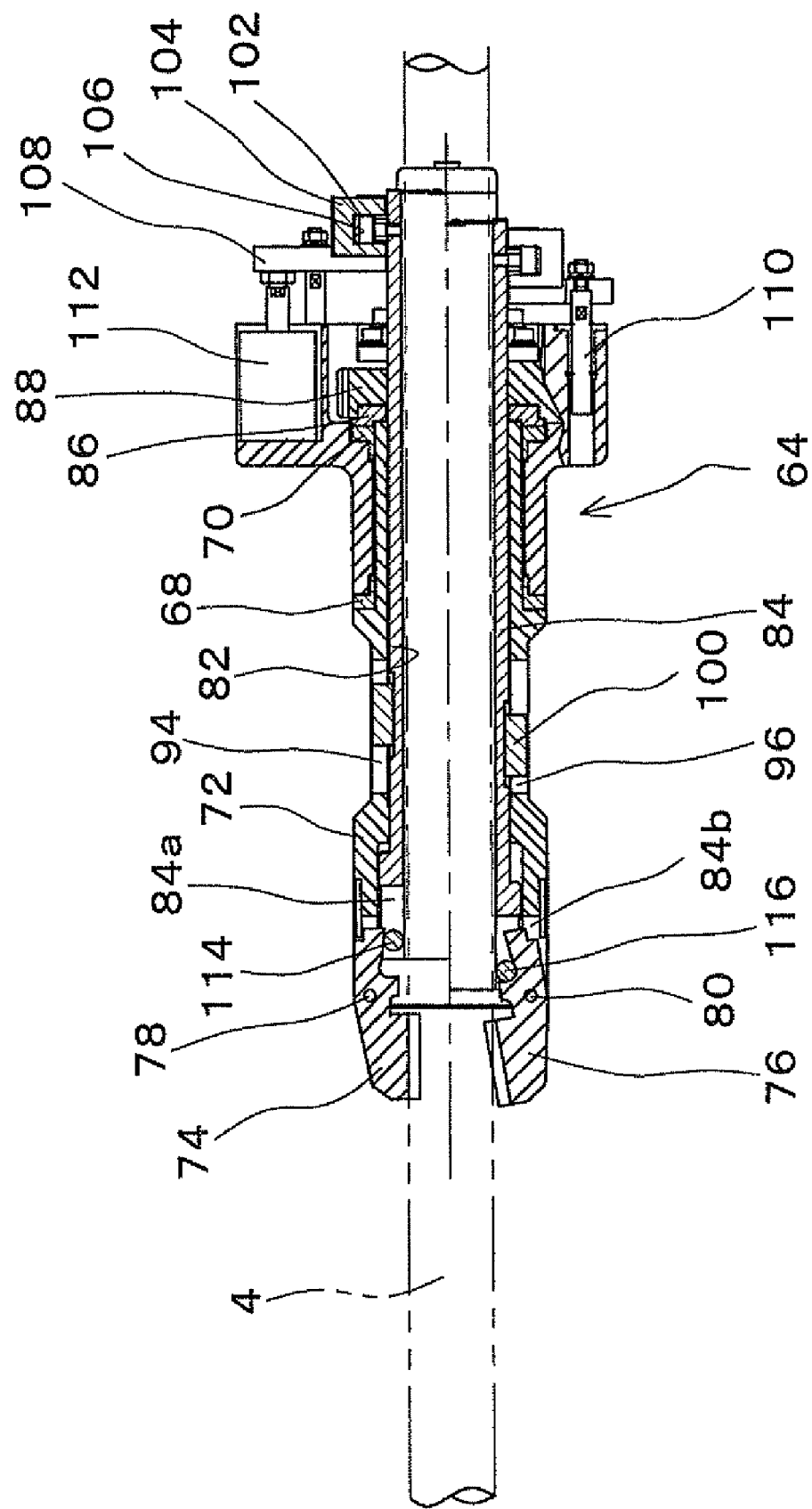
FIG. 6 is a cross-sectional view taken along line VI-VI of FIG. 5.
Figure 7:
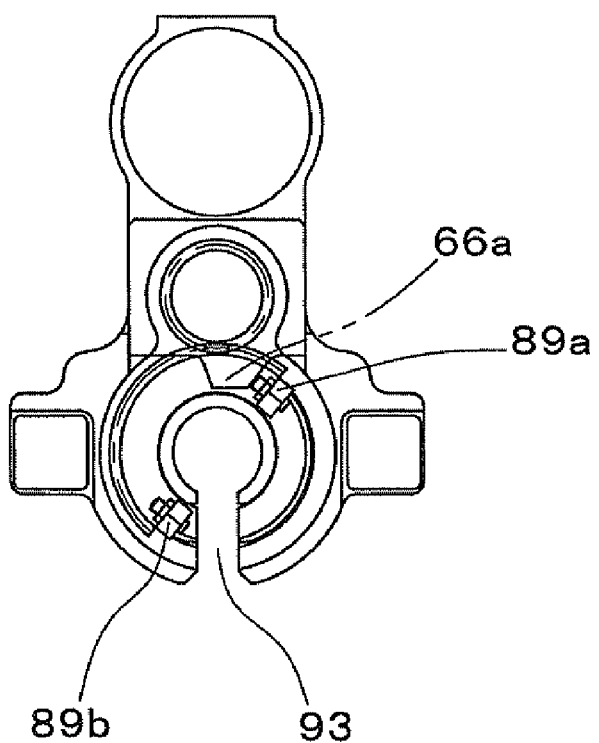
FIG. 7 is an enlarged side elevational view of the chuck mechanism in the first embodiment.

Also, a chuck mechanism 64 having a twisting mechanism 62 is attached to an end of the distal end arm 26 of the articulated robot 2. As shown in FIGS. 5-7, the chuck mechanism 64 includes a turning member 72 turnably supported by a chuck body 66 via a pair of bearings 68, 70. A turning axis of the turning member 72 is arranged to be parallel to the above-mentioned horizontal axes CH1, CH2 and CH3.

A pair of claw members 74, 76 are supported at a front end of the turning member 72 so as to be swingable around fulcrum pins 78, 80. The turning member 72 includes a sliding hole 82 formed in an axial direction thereof, and a tubular member 84 is slidably inserted into the sliding hole 82. The tubular member 84 is hollow, allowing the workpiece 4 to be inserted therethrough.

A gear 88 is attached to a rear end of the turning member 72 via a connection member 86, and a pinion gear 92, which is attached to a hydraulic motor 90 fixed to the chuck body 66, is engaged with the gear 88.

As shown in FIG. 7, the gear 88 has a 180 degree sector shape, and it is configured such that a pair of stopper members 89a, 89b attached to the gear 88 hit a projecting portion 66a integrally formed with the chuck body 66, to thereby turn the gear 88 within a predetermined angle range of 120 degrees. Also, a cutout portion 93 is provided in the chuck body 66, the turning member 72 and the tubular member 84 in their longitudinal directions to allow the mandrel 61 to pass through the cutout portion 93.

Key members 98, 100 attached to the tubular member 84 are slidably placed in a pair of slits 94, 96 formed in the turning member 72, and the turning member 72 and the tubular member 84 are configured to be relatively axially slidable but integrally turnable with each other around the longitudinal direction of the workpiece 4.

As shown in FIG. 6, a plurality of cam followers 102 are attached to an outer periphery of a rear end of the tubular member 84 along a circumferential direction thereof, and the cam followers 102 are inserted in a groove 106 formed in a transfer member 104.

The transfer member 104 is attached to a pressure plate 108, and the pressure plate 108 is held by guide shafts 110, which are slidably mounted to the chuck body 66, so as to be movable in a sliding direction of the tubular member 84. Also, a rod of a cylinder 112 mounted to the chuck body 66 is connected to the pressure plate 108.

Pins 114, 116 are provided in slits 84a, 84h at a front end of the tubular member 84. It is configured such that the pins 114, 116 are engaged with the claw members 74, 76, and that when the tubular member 84 is moved forward or rearward, the claw members 74, 76 swing, and thereby a periphery of the workpiece 4 is released from or held by the claw members 74, 76.

FIG. 6 shows, above a center line, a state in which the tubular member 84 is moved rearward to cause the claw member 74 to swing, and thereby the periphery of the workpiece 4 is held by the claw member 74, while showing, below the center line, a state in which the tubular member 84 is moved forward to cause the claw member 76 to swing, and thereby the workpiece 4 is released from the claw member 76.

Next, a description will be provided on an operation of the bending device in the above embodiment.

First, the first through third parallel joints 6, 8, 10 and the first and second perpendicular joints 12, 14 of the articulated robot 2 are driven to move the chuck mechanism 64 to an end of the workpiece 4, and the chuck mechanism 64 is controlled such that the workpiece 4 is held by the chuck mechanism 64. When holding the workpiece 4 with the chuck mechanism 64, the chuck mechanism 64 is moved so that the workpiece 4 and the tubular member 84 are coaxially positioned, and then is moved in the longitudinal direction of the workpiece 4 to insert the workpiece 4 into the tubular member 84.

Then, the cylinder 112 is driven to move the pressure plate 108 and the transfer member 104, and thereby the tubular member 84 is moved via the cam followers 102. As a result, the claw members 74, 76 are caused to swing and the periphery of the workpiece 4 is held between the claw members 74, 76.

Subsequently, the first through third parallel joints 6, 8, 10 and the first and second perpendicular joints 12, 14 of the articulated robot 2 are driven to move the workpiece 4 to the bending mechanism 40. In doing so, the workpiece 4 is moved such that a point to be bent of the workpiece 4 is inserted into the groove 44 of the bending die 42 as shown in FIG. 4.

After the workpiece 4 is moved, the clamping die 48 and the pressure die 52 are driven to hit the workpiece 4, the bending arm 46 is turned centering around the bending die 42 to revolve the clamping die 48 around the bending die 42, and simultaneously the cylinder 56 is driven to move the pressure die 52 in the axial direction of the workpiece 4 by means of the slide base 53, and thus bending is performed. The mandrel 61 may be inserted into the workpiece 4 by the mandrel mechanism 60 while performing the bending.

After the bending is completed, the bending arm 46, the clamping die 48 and the pressure die 52 are returned to their original positions. When a next bending is to be performed, the articulated robot 2 is controlled to move the chuck mechanism 64, to thereby move the workpiece 4 to a next bending point, and bending of the workpiece 4 is performed by the bending mechanism 40.

Figure 8A:
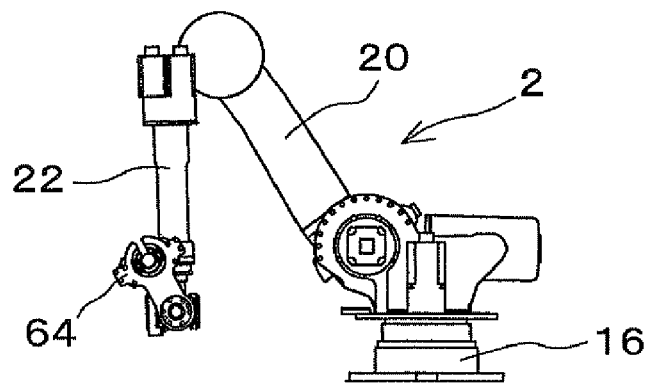
FIGS. 8A-8C are explanatory views illustrating twisting by the articulated robot in the first embodiment.
Figure 8B:
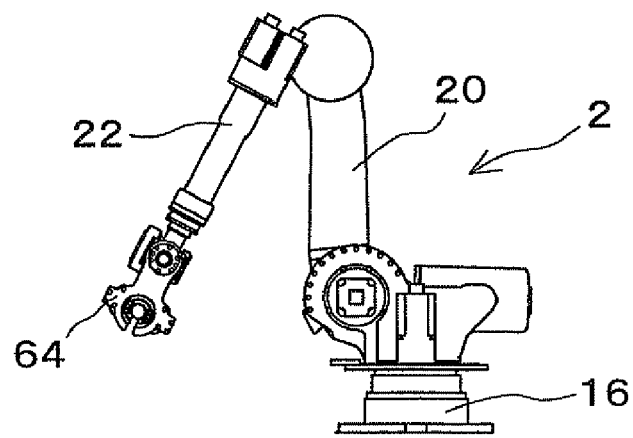
Figure 8C:
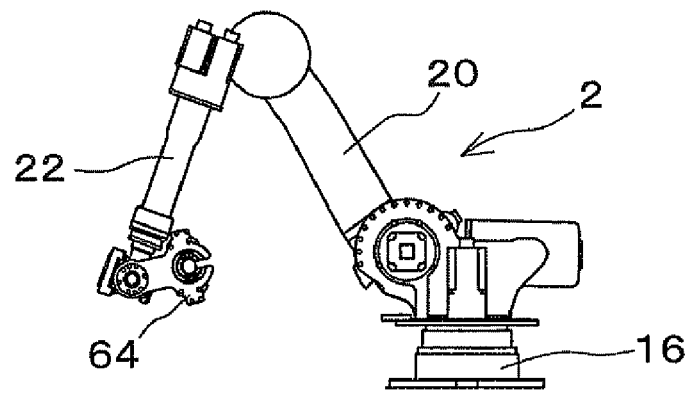

To change a bending direction, the first through third parallel joints 6, 8, 10 of the articulated robot 2 are controlled to turn the chuck mechanism 64, which is holding the workpiece 4, around the longitudinal direction of the workpiece 4, as shown in FIGS. 8A, 8B, 8C. As a result, the workpiece 4 is twisted around the longitudinal direction thereof, and thus the bending direction can be changed. However, when the workpiece 4 is twisted by controlling the first through third parallel joints 6, 8, 10, the workpiece 4 cannot be twisted by 360 degree due to interference between the second arm 22 and the workpiece 4.

In this case, the hydraulic motor 90 is driven to turn the pinion gear 92, the gear 88, the turning member 72, the keys 98, 100, the tubular member 84 and the claw members 74, 76 around the longitudinal direction of the workpiece 4. As a result, the workpiece 4 is twisted around the longitudinal direction thereof along with the chuck mechanism 64

In the present embodiment, the workpiece 4 can be twisted within an angle range until the stopper members 89a, 89b hit the projecting portion 66a. Therefore, the first through third parallel joints 6, 8, 10 of the articulated robot 2 are controlled to turn the chuck mechanism 64 until the stopper members 89a, 89b hit the projecting portion 66a to achieve a required bending direction, and thus the workpiece 4 is further twisted.

After the bending is completed, the chuck mechanism 64 is controlled to release the workpiece 4. Since the articulated robot 2 moves the workpiece 4 to the bending mechanism 40 with the workpiece 4 held by the chuck mechanism 64, and the workpiece 4 is subjected to bending, the device can be made small in size, and requires less installation space. Also, since the workpiece 4 is turned around its longitudinal direction by means of the chuck mechanism, it is possible to avoid interference between the second arm 22 and the workpiece 4, and to change the bending direction of the workpiece 4 within 360 degree.

Second Embodiment

Since the major structure of a bending device in a second embodiment is the same as that in the first embodiment, a description of the major structure is not repeated.

Figure 9:
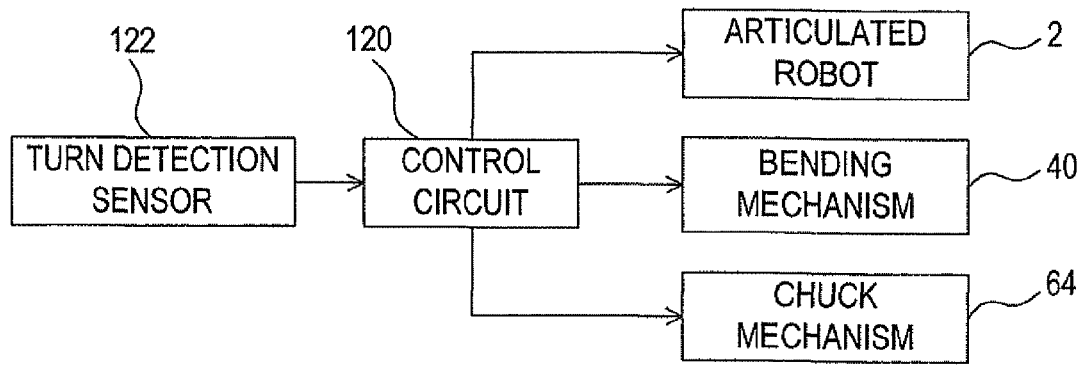
FIG. 9 is a block diagram showing a control system of a bending device in a second embodiment.

In the present embodiment, as shown in FIG. 9, the articulated robot 2, the chuck mechanism 64 and the bending mechanism 40 are connected to a control circuit 120 as control means, and a turning angle of the bending arm 46 is detected by a turn detection sensor 122 using an encoder and is outputted to the control circuit 120.

Figure 10:
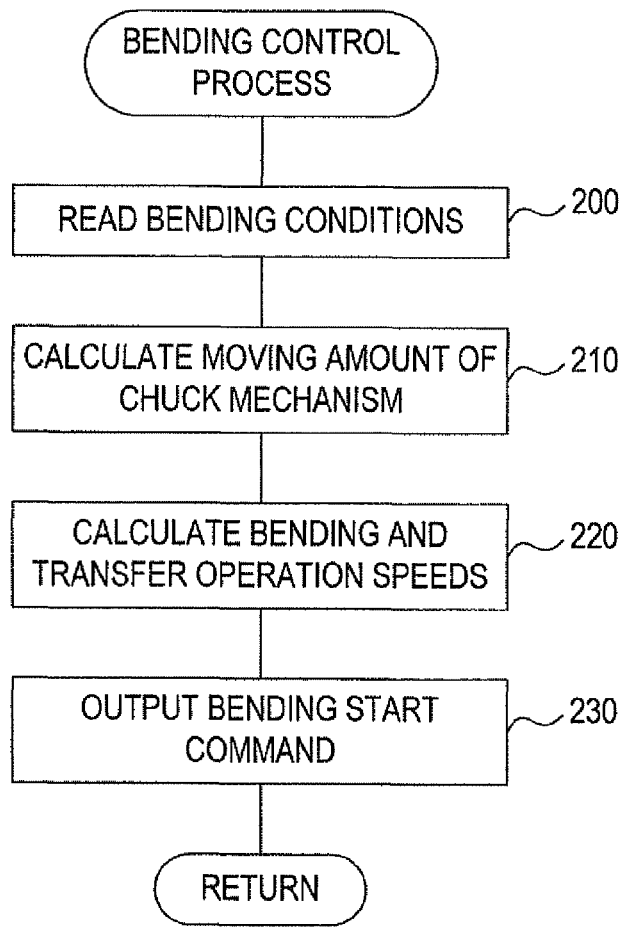
FIG. 10 is a flowchart showing an example of a bending control process, which is performed in a control circuit of the second embodiment.
Figure 11:
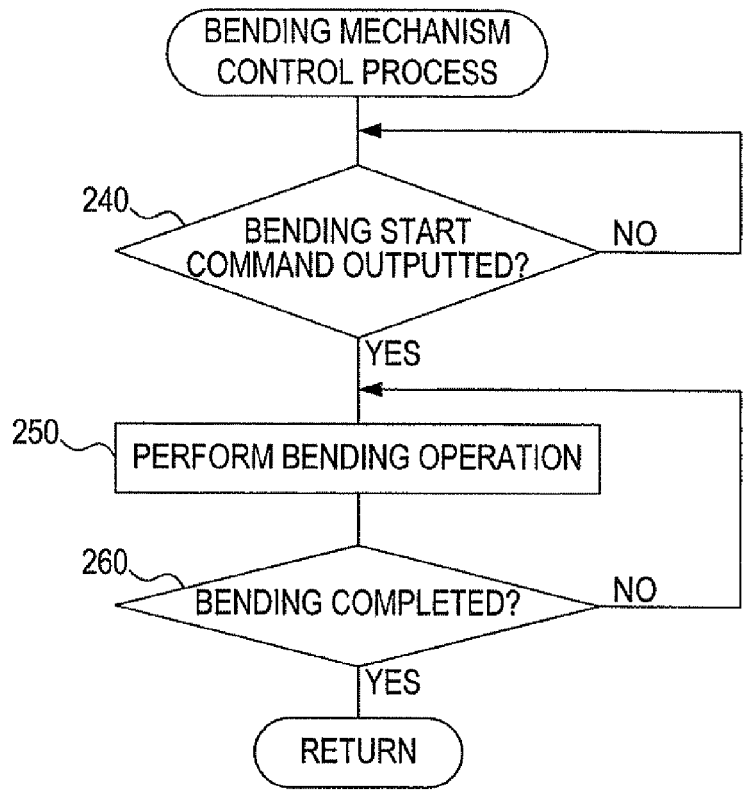
FIG. 11 is a flowchart showing an example of a bending mechanism control process, which is performed in the control circuit of the second embodiment.
Figure 12:
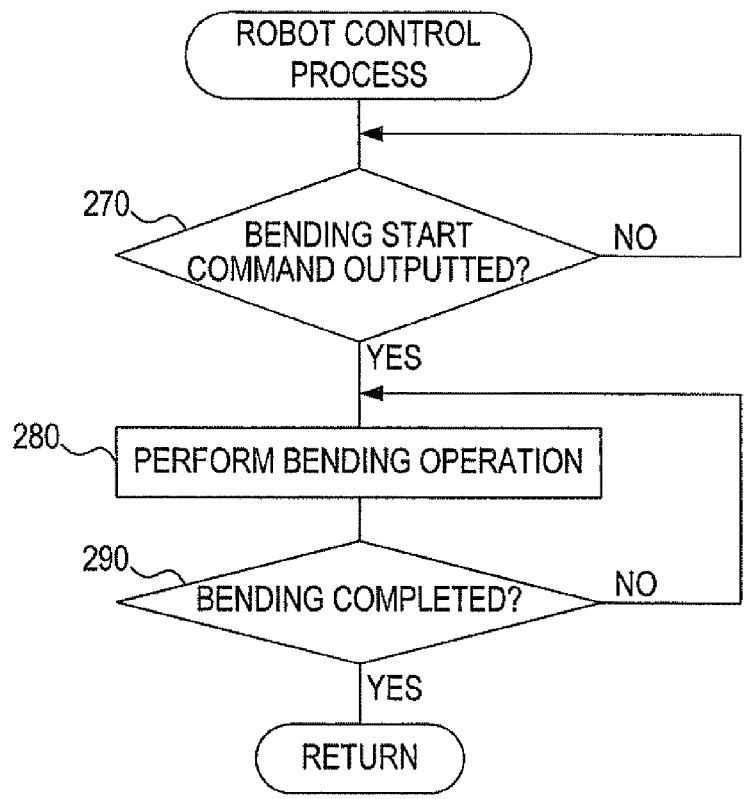
FIG. 12 is a flowchart showing an example of a robot control process, which is performed in the control circuit of the second embodiment.

Next, an explanation will be provided with reference to flowcharts shown in FIG. 10 through FIG. 12 regarding the above-described operation of the bending device as well as a bending control process performed by the control circuit 120.

First, the first through third parallel joints 6, 8, 10 and the first and second perpendicular joints 12, 14 of the articulated robot 2 are driven to move the chuck mechanism 64 to an end of the workpiece 4, and the chuck mechanism 64 is controlled such that the workpiece 4 is held by the chuck mechanism 64. When holding the workpiece 4, the chuck mechanism 64 is moved so that the workpiece 4 and the tubular member 84 are coaxially positioned, and then the chuck mechanism 64 is moved in a longitudinal direction of the workpiece 4 to insert the workpiece 4 into the tubular member 84.

Then, the cylinder 122 is driven to move the pressure plate 108 and the transfer member 104, to thereby move the tubular member 84 via the cam followers 102. As a result, the claw members 74, 76 are caused to swing and the periphery of the workpiece 4 is held by the claw members 74, 76.

Subsequently, the first through third parallel joints 6, 8, 10 and the first and second perpendicular joints 12, 14 of the articulated robot 2 are driven to move the workplace 4 to the bending mechanism 40. In doing so, the workpiece 4 is moved such that a point to be bent is inserted into the groove 44 of the bending die 42 as shown in FIG. 4.

After the workplace 4 is moved, the clamping die and the pressure die 52 are driven to hit the workpiece 4, the bending arm 46 is turned centering around the bending die 42 to thereby revolve the clamping die 48 around the bending die 42, and simultaneously the cylinder 56 is driven to move the pressure die 52 in the axial direction of the workpiece 4 by means of the slide base 53, and thus bending is performed. The mandrel 61 may be inserted into the workpiece 4 by the mandrel mechanism 60 while performing the bending.

After the bending is completed, the bending arm 46, the clamping die 48 and the pressure die 52 are returned to their original positions. When a next bending is to be performed, the articulated robot 2 is controlled to move the chuck mechanism 64, to thereby move the workpiece 4 to a next bending point, and bending of the workpiece 4 is performed by the bending mechanism 40.

In the bending, while the clamping die 48 is revolved around the bending die 42, the workpiece 4 is held between the bending die 42 and the clamping die 48, and the bending die 42 is turned along with the bending arm 46. During this, the workpiece 4 is pulled out in its longitudinal direction.

In the bending, a bending control process is performed. As shown in FIG. 10, bending conditions, such as a bending angle and a bending radius of the bending die 42, are first read (Step 200), and a moving amount of the chuck mechanism 64 is calculated from the bending angle and the bending radius of the bending die 42 (Step 210). That is, a moving amount of the workpiece 4 while being pulled out in the longitudinal direction thereof during the bending is calculated.

Next, a bending operation speed for turning the bending arm 46 and a transfer operation speed for moving the chuck mechanism 64 are calculated (Step 220). The bending operation speed is a speed at which the bending arm 46 is turned by the first cylinder 47, while the transfer operation speed is a speed at which the chuck mechanism 64 is transferred in the longitudinal direction of the workpiece 4 by the articulated robot 2.

To perform bending by turning the bending arm 46 in accordance with the bending angle of the workpiece 4, calculation is performed such that the bending operation speed at which the workpiece 4 is pulled out by turning the bending arm 46 by the first cylinder 47 and the transfer operation speed of the chuck mechanism 64 by the articulated robot 2 are the same.

After the operation speeds are calculated, a bending start command is outputted to the articulated robot 2 and the bending mechanism 40 (Step 230). When the bending start command is output, the workpiece 4 is held by the chuck mechanism 64 of the articulated robot 2, and the point to be bent of the workpiece 4 is inserted in the groove 44 of the bending die 42, and additionally in the bending mechanism 40, the clamping die 48 and the pressure die 52 are driven to hit the workpiece 4, as shown in FIG. 4, to thereby hold the workpiece 4 between the bending die 42 and the clamping die 48.

When the bending start command is outputted (Step 240), the bending mechanism 40 drives the first cylinder 47 at the bending operation speed calculated by the processing in Step 220 and performs bending operation to turn the bending arm 46 (Step 250). When bending operation of the bending arm 46 is performed by the first cylinder 47 in accordance with a predetermined bending angle, it is determined that bending has been completed (Step 260). In doing this, the bending angle of the bending arm 46 is detected by a turn detection sensor 122.

When the bending start command is outputted (Step 270), the transfer operation to move the chuck mechanism 64 is performed by the articulated robot 2 (Step 280). In doing this, the articulated robot 2 is controlled such that the moving amount of the chuck mechanism 64 calculated by the processing in Step 210 and the transfer operation speed of the chuck mechanism 64 calculated by the processing in Step 220 are achieved. When the chuck mechanism 64 is moved, it is determined that bending has been completed (Step 290).

In the bending, as described above, the chuck mechanism 64 is moved by the articulated robot 2 with the workpiece 4 held by the chuck mechanism 64 and the workpiece 4 is bent by the bending mechanism 40. Thus, the workpiece 4 may be bent in a preferred manner while the workpiece 4 is securely supported.

The present invention described above is not limited to these embodiments, but may be practiced in various forms within the scope not departing from the spirit of the present invention. For example, the first embodiment and the second embodiment have been described as separate embodiments, it may of course be possible to practice the invention by incorporating the functions of the second embodiment into the bending device of the first embodiment.

What is claimed is:

1. A bending device having a bending mechanism for holding an elongated workpiece between a bending die and a clamping die revolvable around the bending die, and revolving the clamping die, to thereby bend the workpiece, the bending device comprising:
a fixing base on which the bending mechanism is mounted,
an articulated robot on which a chuck mechanism for holding the workpiece is mounted and which moves the chuck mechanism; and
a control unit that is configured to calculate a moving amount and a transfer operation speed of the chuck mechanism from bending conditions, and to move the chuck mechanism holding the workpiece, by the moving amount and at the transfer operation speed, in a longitudinal direction of the workpiece by means of the articulated robot when bending the workpiece by revolving the clamping die by means of the bending mechanism;
wherein the control unit is further configured to calculate a bending operation speed for revolving the clamp die around the bending die, and wherein the bending operation speed is the same as the transfer operation speed.

2. The bending device according to claim 1, wherein the chuck mechanism is configured to turn the workpiece around the longitudinal direction of the workpiece.

3. The bending device according to claim 1, wherein the articulated robot includes a plurality of parallel joints turning around mutually parallel axes and a plurality of perpendicular joints turning around axes perpendicular to the parallel axes.

4. The bending device according to claim 1, wherein the chuck mechanism includes a turnably supported turning member and claw members swingably supported by the turning member, and wherein the chuck mechanism supports a tubular member, into which the workpiece is longitudinally inserted, so as to be slidable in the turning member, and moves the tubular member to cause the claw members to swing and hold a periphery of the workpiece.

5. The bending device according to claim 1, wherein the chuck mechanism comprises a turning member, and wherein the chuck mechanism is configured to turn the turning member within a predetermined angle range, to thereby twist the workpiece held by the chuck mechanism around the longitudinal direction of the workpiece within the predetermined angle range.

* * * * *